(12) United States Patent
Liu et al.

(10) Patent No.: US 11,683,135 B2
(45) Date of Patent: Jun. 20, 2023

(54) METHODS AND APPARATUSES FOR DOWNLINK CONTROL INFORMATION TRANSMISSION AND RECEIVING

(71) Applicant: NEC CORPORATION, Tokyo (JP)

(72) Inventors: Hongmei Liu, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/739,779

(22) Filed: May 9, 2022

(65) Prior Publication Data
US 2022/0263617 A1 Aug. 18, 2022

Related U.S. Application Data

(63) Continuation of application No. 16/475,834, filed as application No. PCT/CN2017/070309 on Jan. 5, 2017, now Pat. No. 11,343,034.

(51) Int. Cl.
| | |
|---|---|
| *H04L 5/00* | (2006.01) |
| *H04W 76/11* | (2018.01) |
| *H04B 1/7143* | (2011.01) |
| *H04L 1/1607* | (2023.01) |
| *H04W 24/08* | (2009.01) |

(Continued)

(52) U.S. Cl.
CPC ......... *H04L 5/0044* (2013.01); *H04B 1/7143* (2013.01); *H04L 1/1642* (2013.01); *H04L 5/0094* (2013.01); *H04W 24/08* (2013.01); *H04W 72/0446* (2013.01); *H04W 72/0453* (2013.01); *H04W 72/23* (2023.01); *H04W 76/11* (2018.02)

(58) Field of Classification Search
None
See application file for complete search history.

(56) References Cited

U.S. PATENT DOCUMENTS

| | | |
|---|---|---|
| 2002/0016858 A1 | 2/2002 | Sawada |
| 2002/0147920 A1 | 10/2002 | Mauro |

(Continued)

FOREIGN PATENT DOCUMENTS

| | | |
|---|---|---|
| CN | 103095396 A | 5/2013 |
| CN | 103580790 A | 2/2014 |

(Continued)

OTHER PUBLICATIONS

International Search Report for PCT/CN2017/070309 dated Sep. 6, 2017 [PCT/ISA/210].

(Continued)

*Primary Examiner* — Brian S Roberts
(74) *Attorney, Agent, or Firm* — Sughrue Mion, PLLC

(57) ABSTRACT

Embodiments of the present disclosure relate to methods and apparatuses for downlink control information (DCI) transmission and receiving in a wireless communication system. A DCI configuration parameter can be first transmitted to a terminal device; and then DCI is transmitted to the terminal device, wherein the DCI configuration parameter indicates time-frequency resources for the DCI. With embodiments of the present disclosure, the UE could perform a flexible DCI monitoring according to the DCI configuration parameter and thus it may support the DCI monitoring occasion change due to numerology and scheduling unit size.

9 Claims, 8 Drawing Sheets

100

101 — Transmitting a DCI configuration parameter to a terminal device

102 — Transmitting DCI to the terminal device, wherein the DCI configuration parameter indicates time-frequency resources for the DCI

(51) Int. Cl.
*H04W 72/0446* (2023.01)
*H04W 72/0453* (2023.01)
*H04W 72/23* (2023.01)

(56) References Cited

U.S. PATENT DOCUMENTS

| | | | |
|---|---|---|---|
| 2013/0195041 A1 | 8/2013 | Papasakellariou | |
| 2014/0004857 A1 | 1/2014 | Run | |
| 2014/0341143 A1* | 11/2014 | Yang | H04W 72/23 370/329 |
| 2016/0345301 A1 | 11/2016 | Webb | |
| 2016/0345311 A1 | 11/2016 | Chen et al. | |
| 2016/0345314 A1 | 11/2016 | Webb et al. | |
| 2016/0380737 A1 | 12/2016 | Ahn et al. | |
| 2017/0230994 A1 | 8/2017 | You | |
| 2018/0019794 A1* | 1/2018 | Kowalski | H04L 5/003 |
| 2018/0092073 A1 | 3/2018 | Nogami | |
| 2020/0100219 A1* | 3/2020 | Takeda | H04L 5/0053 |

FOREIGN PATENT DOCUMENTS

| | | |
|---|---|---|
| CN | 104009820 A | 8/2014 |
| CN | 102611524 B | 2/2015 |
| CN | 106161312 A | 11/2016 |
| JP | 2016529805 A | 9/2016 |
| WO | 2007051060 A1 | 5/2001 |
| WO | 2015/079971 A1 | 6/2015 |
| WO | 2016121910 A1 | 8/2016 |
| WO | 2016204165 A1 | 12/2016 |
| WO | 2016182050 A1 | 3/2018 |

OTHER PUBLICATIONS

Communication dated Aug. 11, 2020, from the Japanese Patent Office in application No. 2019-536872.
Communication dated Mar. 10, 2020, from the Japanese Patent Office in application No. 2019-536872.
Communication dated Dec. 24, 2019 from the Japanese Patent Office in application No. 2019-536872.
NTT Docomo,"Discussion on multiple-step DCI for NR",3GPP TSG-RAN WG1 Meeting #87, RI-1612717,URL,https://www.3gpp.org/ftp/tsg_ran/WG1_RL1/TSGR1_87/Docs/R1-1612190.zip, Nov. 18, 2016, pp. 2-4 (3 pages total).
CMCC,"Discussion on DCI contents for NR PDCCH",3GPP TSG-RAN WG1 Meeting #87, RI-161290,URL,https://www.3gpp.org/ftp/tsg_ran/WG1_RL1/TSGR1_87/Docs/R1-1612190.zip, Nov. 18, 2016, pp. 2-4 (3 pages total).
Samsung, "DCI Formats and Contents for NR", 3GPP TSG RAN WG1 #87, Reno, USA, Nov. 14-18, 2016, R1-1612534, 5 pages.
Alcatel-Lucent, Alcatel-Lucent Shanghai Bell, "RRC configured Layer 1 parameters", TSG-RAN WG2#73bis, Shanghai, China, Apr. 11-15, 2011, R2-112205, 5 pages.
Communication dated May 21, 2021, issued by the State Intellectual Property Office of the P.R.C. in application No. 201780082090.5.
Office Action Non-Final corresponding to U.S. Appl. No. 16/475,834, dated Sep. 22, 2020.
Office Action Final corresponding to U.S. Appl. No. 16/475,834, dated Feb. 16, 2021.
Advisory Action corresponding to U.S. Appl. No. 16/475,834, dated Jun. 1, 2021.
Office Action Non-Final corresponding to U.S. Appl. No. 16/475,834, dated Jul. 6, 2021.
Notice of Allowance corresponding to U.S. Appl. No. 16/475,834, dated Jan. 27, 2022.
Issue Notification corresponding to U.S. Appl. No. 16/475,834, dated May 5, 2022.

* cited by examiner

TDM

TDM by symbol

FDM

TDM and FDM

TDM and FDM

METHODS AND APPARATUSES FOR DOWNLINK CONTROL INFORMATION TRANSMISSION AND RECEIVING

CROSS REFERENCE TO RELATED APPLICATIONS

This application is a Continuation application of U.S. patent application Ser. No. 16/475,834, filed on Jul. 3, 2019, which is a National Stage of International Application No. PCT/CN2017/070309, filed on Jan. 5, 2017.

FIELD OF THE INVENTION

The non-limiting and exemplary embodiments of the present disclosure generally relate to the field of wireless communication techniques, and more particularly relate to methods and apparatuses for downlink control information (DCI) transmission and receiving in a wireless communication system.

BACKGROUND OF THE INVENTION

New radio access system, which is called as new RAT (NR) system or network for short, is the next generation communication system. In Radio Access Network (RAN) #71 meeting for the third generation Partnership Project (3GPP) working group, study of NR system was approved. The NR system will consider frequency ranging up to 100 Ghz with an object of a single technical framework addressing all usage scenarios, requirements and deployment scenarios defined in Technical Report TR 38.913, which include requirements such as enhanced mobile broadband, massive machine-type communications, ultra reliable and low latency communications.

Especially, in the NR network, different numerologies will coexist in the same carrier and a mini-slot will be introduced to carry Ultra-reliable low latency communication (URLLC) traffic. As a result, DCI monitoring may be performed per symbol based on the specific numerology. Thus, a terminal device like user equipment (UE) needs to know when to monitor the DCI for scheduling related operations.

In current LTE system, DCI monitoring is performed per subframe or per slot if the UE is in on duration of the discontinuous reception (DRX) active state. The DRX periodicity can be configured by higher layers.

However, with the current DCI monitoring solution in LTE, it cannot support the DCI monitoring occasion change due to numerology and scheduling unit size.

SUMMARY OF THE INVENTION

In patent cooperation treaty (PCT) application publication No. WO2016190970A1, there were proposed techniques for selecting data communications with shortened time duration wherein a two-stage grant for communication scheduling was introduced, the first stage grant could include an indication to activate/deactivate ultra-low latency (ULL) communication.

In US application US20160119969A1, there was proposed a solution for MAC enhancement for concurrent legacy and enhanced component carrier (ECC) operation, wherein a two stage Semi-Persistent Scheduling (SPS) solution was introduced and a first stage grant could contain parameters that may not change much over the course of a given SPS instance while the second stage grant could contain the actual resource for the SPS scheduling.

In another PCT application publication No. WO2016069270A1, there was proposed another two-stage PDCCH wherein a fast DCI could include a DCI flag and DCI format size indicator to indicate the existence and the size of the slow DCI in the same TTI.

However, none of the above solutions can address the problems as presented in the back ground.

To this end, in the present disclosure, there is provided a new solution for DCI transmission and receiving in a wireless communication system, to mitigate or at least alleviate at least part of the issues in the prior art.

According to a first aspect of the present disclosure, there is provided a DCI transmission in a wireless communication system. The method comprises transmitting a DCI configuration parameter to a terminal device; and transmitting DCI to the terminal device, wherein the DCI configuration parameter indicates time-frequency resources for the DCI.

According to a second aspect of the present disclosure, there is provided a method of DCI receiving in a wireless communication system. The method comprises receiving a DCI configuration parameter at a terminal device; and receiving DCI within time-frequency resources indicated by the DCI configuration parameter at the terminal device.

According to a third aspect of the present disclosure, there is provided an apparatus of DCI transmission in a wireless communication system. The apparatus comprises: a parameter transmission module and a DCI transmission module. The parameter transmission module may be configured to transmit a DCI configuration parameter to a terminal device. The DCI transmission module may be configured to transmit DCI to the terminal device, wherein the DCI configuration parameter indicates time-frequency resources for the DCI According to a fourth aspect of the present disclosure, there is provided an apparatus of DCI receiving in a wireless communication system. The apparatus comprises: a parameter receiving module and a DCI receiving module. The parameter receiving module may be configured to receive DCI configuration parameter at a terminal device. The DCI receiving module may be configured to receive DCI within time-frequency resources indicated by the DCI configuration parameter at the terminal device.

According to a fifth aspect of the present disclosure, there is provided a computer-readable storage media with computer program code embodied thereon, the computer program code configured to, when executed, cause an apparatus to perform actions in the method according to any embodiment in the first aspect.

According to a sixth aspect of the present disclosure, there is provided a computer-readable storage media with computer program code embodied thereon, the computer program code configured to, when executed, cause an apparatus to perform actions in the method according to any embodiment in the second aspect.

According to a seventh aspect of the present disclosure, there is provided a computer program product comprising a computer-readable storage media according to the fifth aspect.

According to an eighth aspect of the present disclosure, there is provided a computer program product comprising a computer-readable storage media according to the sixth aspect.

With embodiments of the present disclosure, a DCI configuration parameter can be first transmitted to the terminal device, and then the DCI is transmitted to the terminal device. Thus, the terminal device may monitor the transmitted DCI based on the received DCI configuration parameter, which means a flexible DCI monitoring solution and thus can support the DCI monitoring occasion change due to numerology and scheduling unit size.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein.

DETAILED DESCRIPTION OF EMBODIMENTS

Figure 1:
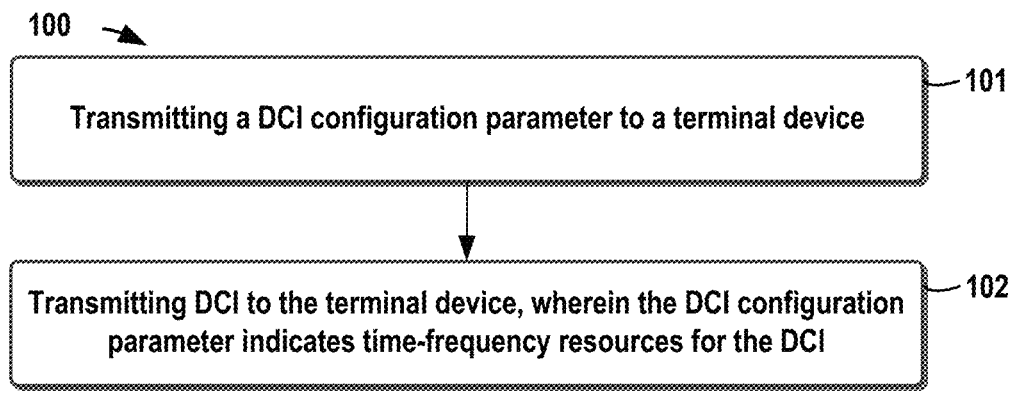
FIG. 1 schematically illustrates a flow chart of a method of DCI transmission according to an example embodiment of the present disclosure.

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a subscriber station, a portable subscriber station, Mobile Station (MS), or an Access Terminal (AT), and some or all of the functions of the UE, the terminal, the MT, the SS, the portable subscriber station, the MS, or the AT may be included. Furthermore, in the context of the present disclosure, the term "BS" may represent, e.g., a node B (NodeB or NB), an evolved NodeB (eNodeB or eNB), gNB (Node B in NR), a radio header (RH), a remote radio head (RRH), a relay, or a low power node such as a femto, a pico, and so on.

As mentioned hereinbefore, none of the prior arts can support the DCI monitoring occasion change due to numerology and scheduling unit size. Thus, in the present disclosure, there is proposed a new DCI transmission and receiving solution. In the proposed solution, a DCI configuration parameter can be first transmitted to the terminal device, and then the DCI is transmitted to the terminal device. Thus, the terminal device may monitor the DCI based on the received DCI configuration parameter, which means a flexible DCI monitoring solution and thus can support the DCI monitoring occasion change due to numerology and scheduling unit size.

Hereinafter, reference will be made to FIGS. 1 to 14 to describe the DCI transmission and receiving solution.

FIG. 1 schematically illustrates a flow chart of a method 100 of DCI transmission in a wireless communication system according to an embodiment of the present disclosure. The method 100 can be performed at a serving node, for example a BS, like a node B (NodeB or NB).

As illustrated in FIG. 1, first in step 101, a DCI configuration parameter is transmitted to a terminal device, and the DCI configuration parameter indicates time-frequency resources for a following DCI.

In an embodiment of the present disclosure, the DCI configuration parameter comprises at least one of: a numerology to be used; a valid duration for the DCI configuration parameter; a duration for a single DCI; and DCI occurrence occasions.

Figure 2:
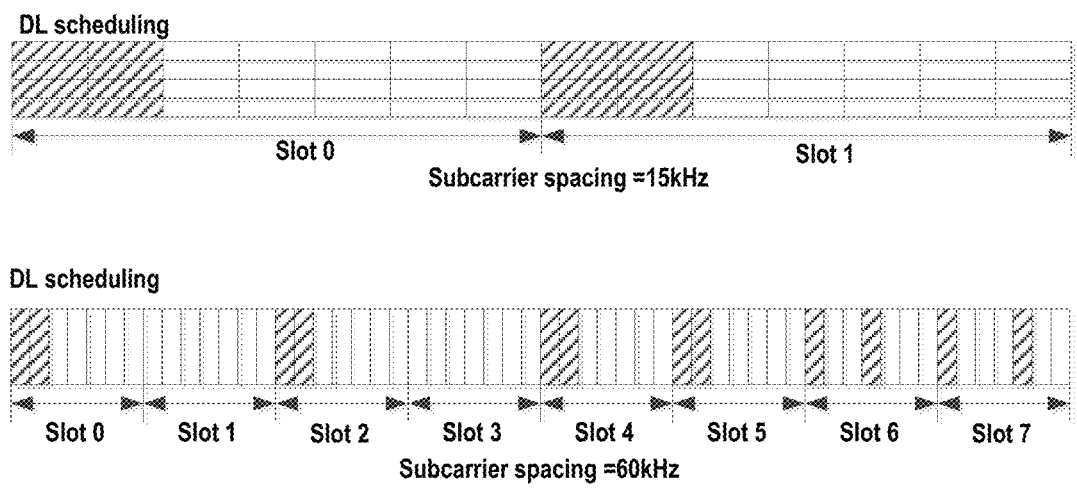
FIG. 2 schematically illustrates DCI occurrence occasions with different numerologies according to example embodiments of the present disclosure.

In NR system, different numerologies might be used, whereas different numerologies might use different transmission parameters, for example different subcarrier spacings. The different subcarrier spacings mean different symbol lengths. For example, for 15 kHz subcarrier spacing, its symbol will have a time length four times as that for 60 kHz subcarrier spacing, as illustrated in FIG. 2. Thus, the numerology to be used can be used to define a symbol.

The valid duration for the DCI configuration parameter indicates a duration in which the DCI configuration parameter is valid. The valid duration can be a number of symbols (for example, numerology specific) or a number of frames (for example numerology common). In an embodiment of the present disclosure, the values of the start of the valid duration can be an absolute value with respect to the reference numerology. For example, if the configuration signaling is received in symbol 7 of the subframe 2 of frame 6, the starting can be defined as symbol 0 of subframe 0 of frame 6. The definition of the absolute value can be predetermined or configured by a high layer signaling like RRC signaling. In another embodiment of the present disclosure, the first symbol carrying the configuration signaling can be used as the start of the valid duration no matter whether the configuration signaling is configured by DCI or by a RRC signaling.

The duration for a single DCI indicates the length of the DCI, it can be a number of symbols. Thus, parameter may indicate the length of DCI. It is also possible to use a predetermined length and in such a case, this parameter can be omitted.

DCI occurrence occasions indicate occasions at which DCI occurs in frames. In an embodiment of the present disclosure, the DCI occurrence occasions can be at a slot level, at subframe level (multi-slot), or at symbol level, as illustrated in FIGS. 3A to 3C respectively.

The DCI occurrence occasions can be periodic. That is to say, the DCI monitoring will be performed periodically, for example every a predetermined number of slots, every a predetermined number of symbols. FIG. 3A and FIG. 3B illustrate two examples of periodic DCI occurrence occasions. In FIG. 3A, the DCI occurrence occasions are per slot; in other words, the DCI monitoring is performed every slot, like in slots 0, 1, . . . . In FIG. 3B, the DCI occurrence occasions are per multi-slot (e.g., 2 slots, a subframe); that is to say, the DCI monitoring can be performed per multi-slot. In such a case, the DCI occurrence occasions can be indicated by the periodicity and an offset of the DCI occurrence. The periodicity can be, for example, a predetermined number of symbols, slots, or frames.

Alternatively, the DCI occurrence occasions can also be aperiodic. FIG. 3C illustrates an aperiodic DCI occurrence occasion. In FIG. 3C, the DCI occurrence occasions are per symbol but aperiodic. In such a case, it may predefine a set of possible aperiodic patterns in specification or pre-configure the possible set of aperiodic patterns by a higher layer signaling. In the set of aperiodic patterns, each aperiodic pattern contains one or more symbols within a valid duration. In such a way, the network can inform the aperiodic pattern index to the terminal device in DCI configuration parameter.

Figure 3A:
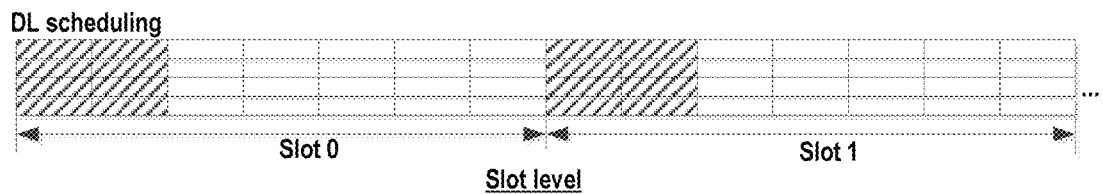
FIGS. 3A to 3C schematically illustrate DCI occurrence occasions at different levels according to examples embodiments of the present disclosure.
Figure 3B:
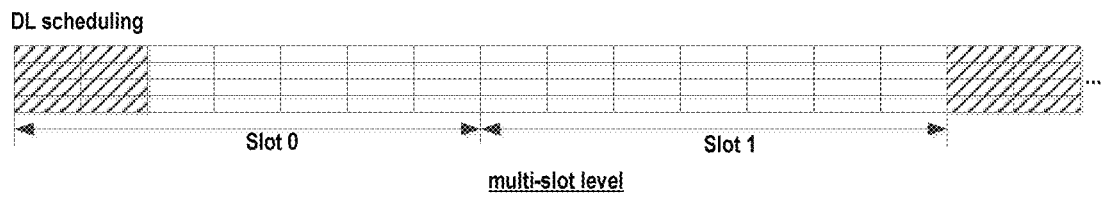
Figure 3C:
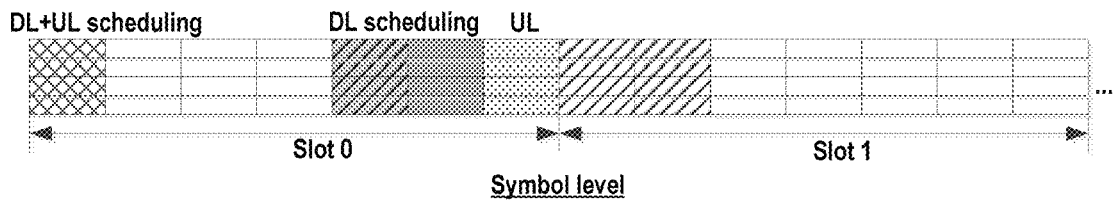

It should be noticed that although the DCI occurrence occasions per slot and multi-slot in FIGS. 3A and 3B are periodic and the DCI occurrence occasions per symbol in FIG. 3C is aperiodic, the present disclosure is not limited thereto. In fact, in each of the DCI occurrence occasions per slot, per multi-slot, per symbol, the DCI occurrence occasions can be periodic or aperiodic.

As another alternative, the DCI occurrence occasions can be a combination of periodic and aperiodic occasions. In other word, in a time period, it contains an aperiodic pattern including one or more symbols but the aperiodic pattern will repeat by the time period in the valid duration. In such a case, the DCI occurrence occasions can be indicated by the periodicity and the aperiodic pattern.

In another embodiment of the present disclosure, the DCI configuration parameter may comprise at least one of: frequency domain resource unit; and frequency hopping pattern.

The frequency domain resource unit indicates the resource unit to be used for DCI in the frequency domain, it could be a control channel element (CCE), a subband, a physical resource block (PRB), or physical resource group (REG). In addition, the frequency domain resource unit can be numerology common, which mean the frequency domain resource unit is same for all numerologies, or numerology specific, which mean that different numerologies might use different frequency domain resource units.

The frequency hopping pattern indicates a pattern in which the frequency hopping is used. This parameter is required when the frequency hopping pattern is used. An explicit signaling can be used to indicate the frequency resource in each DCI occurrence occasion. The hopping pattern can be a predetermined pattern which is known at both network and the terminal device, or a pattern configured by the network. The hopping pattern can be used to calculate the frequency resource position.

Figure 4A:
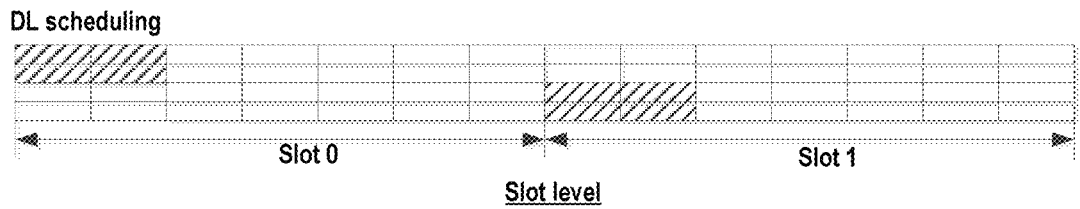
FIGS. 4A and 4C schematically illustrate DCI occurrence occasions with frequency hopping according to example embodiment of the present disclosure.
Figure 4B:
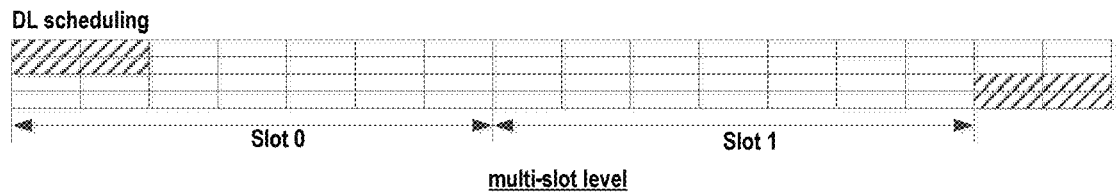
Figure 4C:
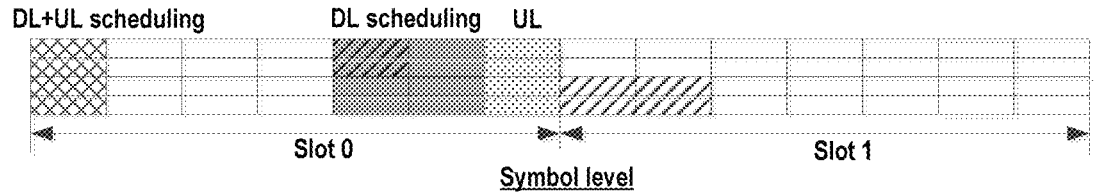

FIGS. 4A to 4C illustrate use of frequency hopping in different DCI occurrence occasions according to embodiments of the present disclosure. DCI occurrence occasions as illustrated in FIG. 4A to FIG. 4C are same with those in FIG. 3A to 3C in the time domain but in the frequency domain, the frequency hopping is used for the DCI occurrence occasions. It should be noticed that although the DCI occurrence occasions per slot and per multi-slot in FIGS. 4A and 4B are periodic and the DCI occurrence occasions per symbol in FIG. 4C is aperiodic, the present disclosure is not limited thereto. In fact, in each of the DCI occurrence occasions per slot, per multi-slot, per symbol, the DCI occurrence occasions can be periodic or aperiodic.

Reference is made back to FIG. 1, in step 102, the DCI can be transmitted to the terminal device. With the DCI configuration parameter, the terminal device may learn the time-frequency resource for the DCI from the DCI configuration parameter and monitor the DCI within the time-frequency resource.

In an embodiment of the present disclosure, the DCI configuration parameter can be transmitted to the terminal device by a higher layer signaling like a RRC signaling. That is to say, in the two-stage solution, for the first stage, the higher layer signaling can be used to transmit the DCI configuration indicating the time-frequency resource for the following DCI in the second stage.

In another embodiment of the present disclosure, the DCI configuration parameter can be transmitted to the terminal device dynamically by another DCI. In such a case, a first DCI is used to transmit the DCI configuration parameter for the following DCI. The actual data scheduling related information is located in the following DCI.

In addition, considering the payload size of the first DCI, it is also possible to use a combination of DCI and high layer signaling. That is to say, a part of DCI configuration parameter can be transmitted by DCI and another part of the DCI configuration parameter can be transmitted by a high layer signaling.

In the two stage DCI solution, the first DCI can be cell specific, beam specific, TRP specific, common for a UE group or UE specific. In an embodiment of the present disclosure, the DCI can be scrambled with a specific RNTI. The periodicity of the first DCI can be larger than the second DCI. The occurrence occasions of the first DCI can predetermined or configured by a higher layer signaling such a RRC signaling. The first DCI can be located in common search space. Or alternative, the first DCI can also be located in UE specific search space.

It shall be noted that there may be a valid duration for the DCI configuration parameter but there is no any restriction on DCI configuration parameter and scheduling unit size. For example, with slot-level DCI monitoring configuration, UE can also be configured with a scheduling unit starting and ending from the symbol boundary rather than a slot boundary. In such a case, the remaining blank symbols can be allocated to other UE with symbol level DCI monitoring configuration. Or alternatively, the remaining blank symbols can also be allocated to other UE with slot-level or multi-slot level DCI configuration.

In a further embodiment of the present disclosure, the DCI configuration parameter may comprise at least two sets of parameters, from which the terminal device can select a set of parameters based on its requested traffic types. In other words, DCI monitoring can be adapted at UE side after resource requirement by means of random access procedure/scheduling request (SR).

After a random access procedure, the terminal device starts DL/UL transmission/reception with the eNB. Thus, the DCI monitoring behavior can be based on the reason for random access. If URLLC scheduling request is the reason for random access, the DCI monitoring should be more frequent. If eMBB scheduling request is the reason for random access, the DCI monitoring can be less frequent. By providing two or more different sets of DCI configuration parameters predefined or configured by RRC signaling, the terminal device could choose the suitable parameter set based on its request traffic type. In such a way, it is possible for UE to perform DCI monitoring based on its required traffic type.

In another aspect of the present disclosure, there is also provided another two-DCI solution for different traffic type multiplexing. In these solutions, two DCIs are used, one of which can be called as prepositive control region (DCI), the other of which can be called as postpostive control region (DCI). The prepositive control region can be used to indicate resource that is allocated to a first traffic type (such as eMBB traffic) but is to be occupied by a second traffic type (such as URLLC traffic), the postpositive control region can be used to indicate resource that allocated to a first traffic type (such as eMBB traffic) but was already occupied by the second traffic type (such as abrupt URLLC traffic). Hereinafter, the URLLC traffic and the eMBB traffic will be taken as examples of different traffic types to describe the two-DCI solution; however, those skilled in the art can readily know that the present disclosure is not limited thereto.

In an embodiment of the present disclosure, the prepositive control region can include at least one of following fields:
  a field to indicate puncture or rate-matching around some time-frequency resource in a following pattern of time-frequency resource;
  a field to schedule on a following pattern of time-frequency resource (e.g. can be contiguous or non-contiguous symbols/frequency bands);
  a field to indicate re-transmission of previous punctured part;
  a field to indicate the end of one transmission block.

In an embodiment of the present disclosure, the postpositive region can include at least one of following fields:
  a field to indicate puncture or no puncture of some time-frequency resources in the previous pattern of time-frequency resource
  a field to indicate re-transmission or no re-transmission of previous punctured part
  a field to indicate the end of one transmission block It shall be noted that patterns of time-frequency resource in prepositive and postpositive control regions can be complementary. For example, the two patterns can compose a whole time-frequency resource of a region (subframe). Alternatively, the two patterns can be also partially overlapped.

Figure 5A:
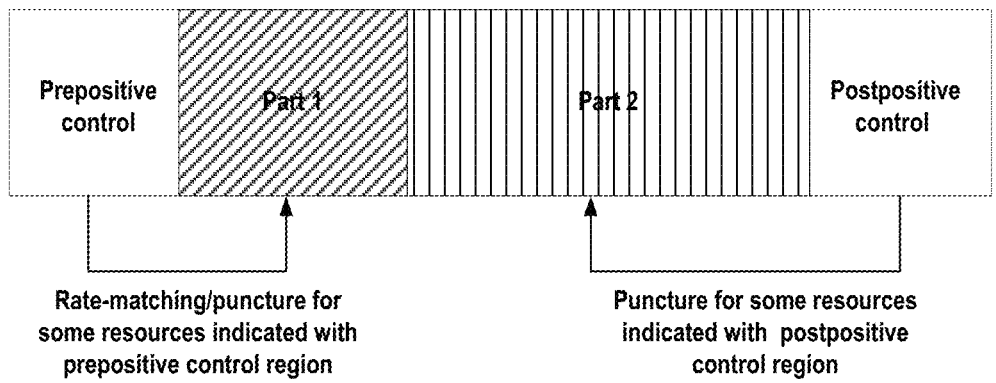
FIG. 5A schematically illustrates a two-DCI solution for enhanced mobile broadband (eMBB) and URLLC multiplexing in which control and data are multiplexed in time domain according to an embodiment of the present disclosure.

FIG. 5A illustrates a two-DCI solution for different traffic type multiplexing according to an embodiment of the present disclosure. The resource of eMBB can be split into two parts as illustrated in FIG. 5, the first one is to be scheduled by the prepostive control region and the other one is to be scheduled by the postpostive control region. For some resources such as first several symbols, the scheduling of URLLC can be known, thus the eMBB UE can be indicated of rate-matching or puncture for the occupied resource in the prepositive control region if it is occupied by the URLLC. While, for some resources, for example when the URLLC occurs abruptly, the scheduling of URLLC cannot be known in the prepositive control region, and thus the eMBB UE can be indicated to puncture for the occupied resources in the postpositive control region.

Figure 5B:
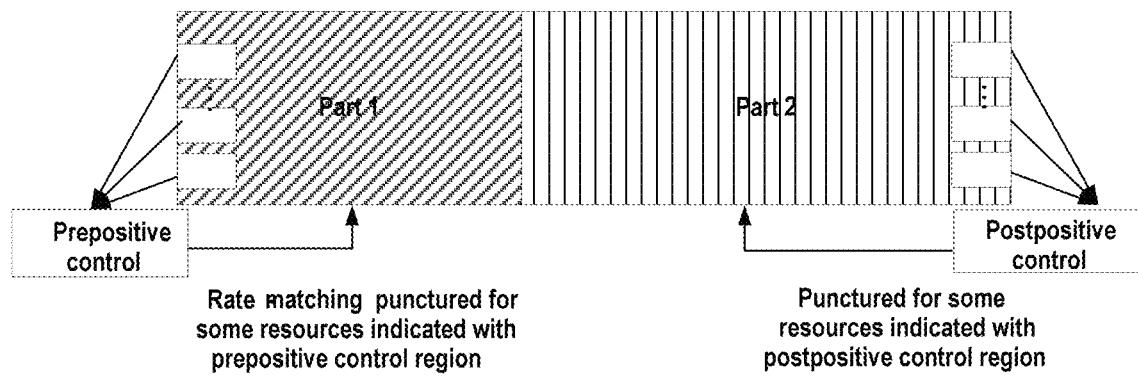
FIG. 5B schematically illustrates a two-DCI solution for eMBB and URLLC multiplexing in which control and data are multiplexed in frequency domain according to an embodiment of the present disclosure.

In FIG. 5A, it is shown that the control regions and the data regions are multiplexed in the time domain. In another embodiment of the present disclosure, the control regions and data regions can be multiplexed in the frequency domain. FIG. 5B illustrates a two-DCI solution for different traffic type multiplexing according to an embodiment of the present disclosure. FIG. 5B is similar with FIG. 5A but differs in that in FIG. 5B, the control regions and data regions are multiplexed in the frequency domain.

It should also be noted that resource indicated to eMBB UE can be resource occupied by URLLC or resource reserved as empty for forward phase.

In addition, it shall also be noted that the split resource parts can also be multiplexed in many different ways, which will be described with reference to FIG. 6A to FIG. 7D.

Figure 6A:
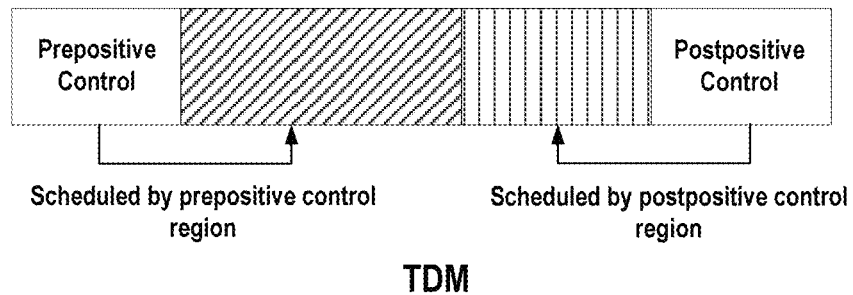
FIGS. 6A to 6D schematically illustrate two-DCI solutions for eMBB and URLLC multiplexing according to an embodiment of the present disclosure, wherein control region and data are multiplexed in time domain and the eMBB and the URLL are multiplexed in TDM, in TDM by symbol, in FDM, and in both FDM and TDM, respectively.

FIG. 6A illustrates a two-DCI solution according to an embodiment of the present disclosure, in which the control region and the data region are multiplexed in TDM and two split parts are multiplexed in time domain multiplexing (TDM). FIG. 6A is substantially same as that in FIG. 5A, and in the two DCI solution, the part scheduled by the prepostive control region is multiplexed with the part scheduled by the postpostive control region in TDM.

Figure 6B:
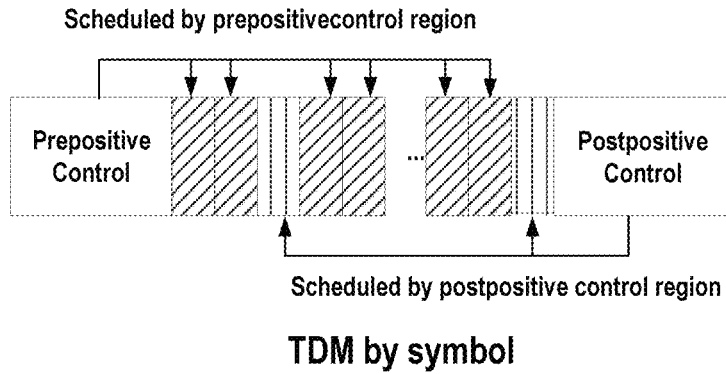

FIG. 6B illustrates another two-DCI solution according to an embodiment of the present disclosure, wherein the control region and the data region are multiplexed in TDM and the two split parts are multiplexed in TDM by symbols. Compared with that illustrated in FIG. 6A, in FIG. 6B, the part scheduled by the prepostive control region is multiplexed with the part scheduled by the postpostive control region also in TDM but by symbol; that is to say, in FIG. 6B, the symbols belonging to each part are not continuous.

Figure 6C:
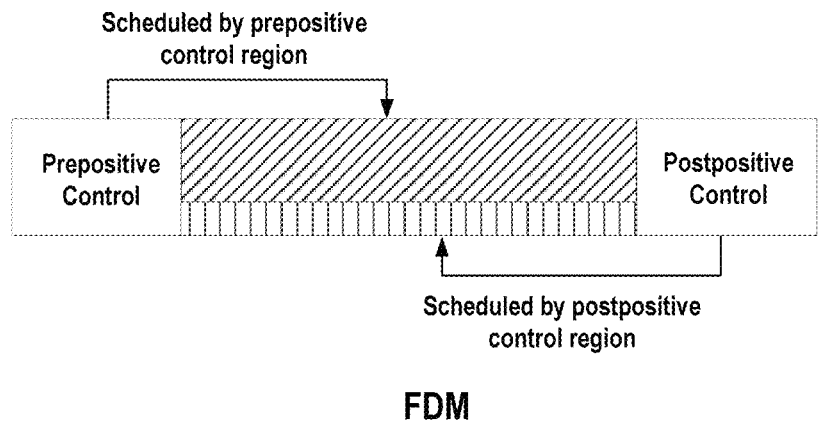

FIG. 6C illustrates a further two-DCI solution according to an embodiment of the present disclosure, wherein the control region and the data region are multiplexed in TDM and the two split parts are multiplexed in frequency domain multiplexing (FDM). Different from that illustrated in FIG. 6A and FIG. 6B, in FIG. 6C the part scheduled by the prepostive control region is multiplexed with the part scheduled by the postpostive control region in FDM, i.e., they respectively occupy different frequency domain resources.

Figure 6D:
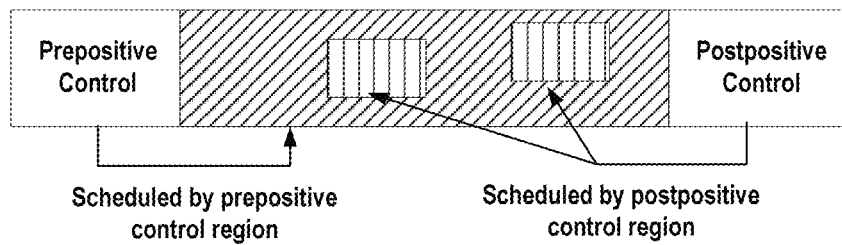

FIG. 6D illustrates a further two-DCI solution according to an embodiment of the present disclosure, wherein the control region and the data region are multiplexed in TDM and the two split parts are multiplexed in TDM and frequency domain multiplexing (FDM). As illustrated in FIG. 6D, the part scheduled by the prepostive control region is multiplexed with the part scheduled by the postpostive control region in a combination of TDM and FDM.

Figure 7A:
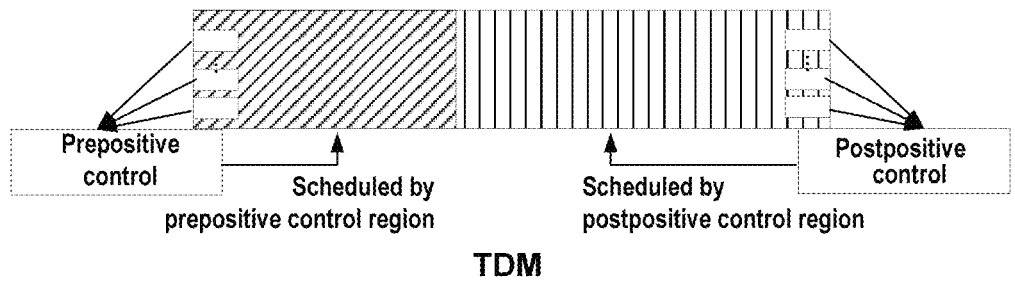
FIGS. 7A to 7D schematically illustrate two-DCI solutions for eMBB and URLLC multiplexing according to an embodiment of the present disclosure, wherein control region and data are multiplexed in frequency domain and the eMBB and the URLL are multiplexed in TDM, in TDM by symbol, in FDM, and in both FDM and TDM, respectively.
Figure 7B:
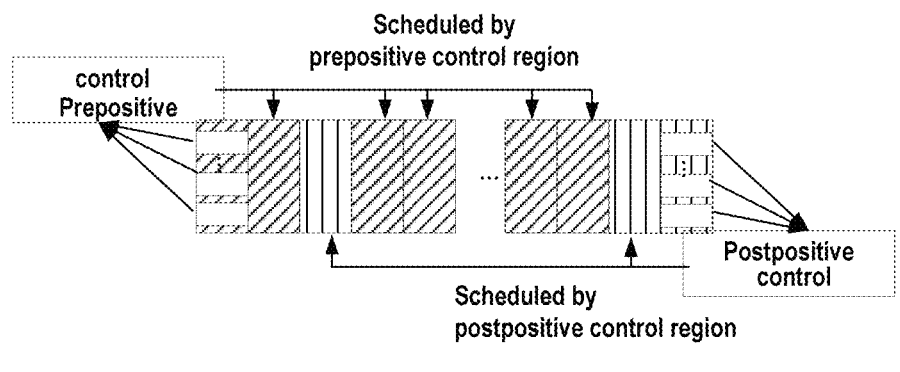
Figure 7C:
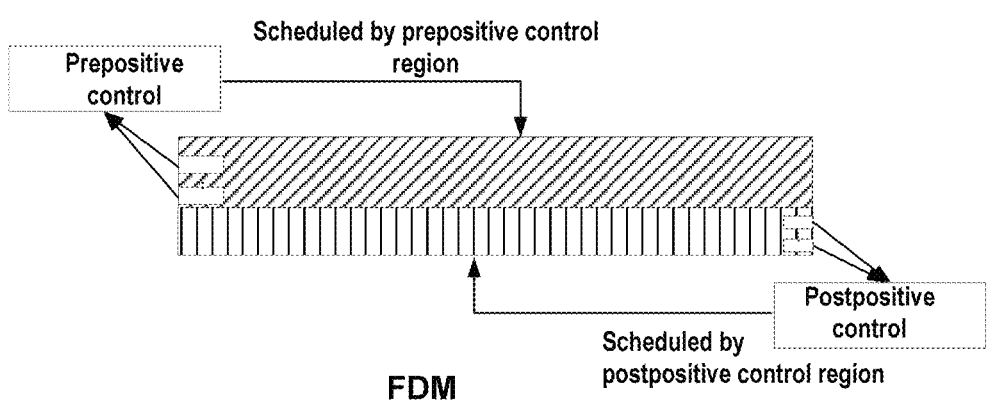
Figure 7D:
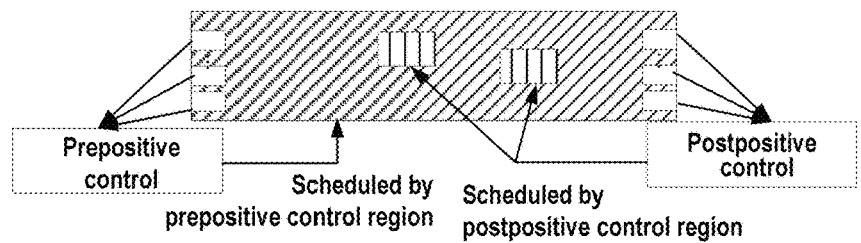

FIGS. 7A to 7D illustrate two-DCI solutions according to an embodiment of the present disclosure, wherein the control region and the data region are multiplexed in FDM and two split parts are multiplexed in different manners respectively. In FIG. 7A, the two split parts are multiplexed in TDM; in FIG. 7B, the two split parts are multiplexed in TDM by symbol; in FIG. 7C, the two split parts are multiplexed in FDM; and FIG. 7D, the two split parts are multiplexed in TDM and FDM.

The two split parts can be decoded in any suitable manner. In an embodiment of the present disclosure, the two split part can be separately decoded. In another embodiment of the present disclosure, the two parts can be cascaded to decode, i.e. when UE receives the two parts, then it decodes them immediately or it decodes them after UE receiving the postpositive control region.

Figure 8:
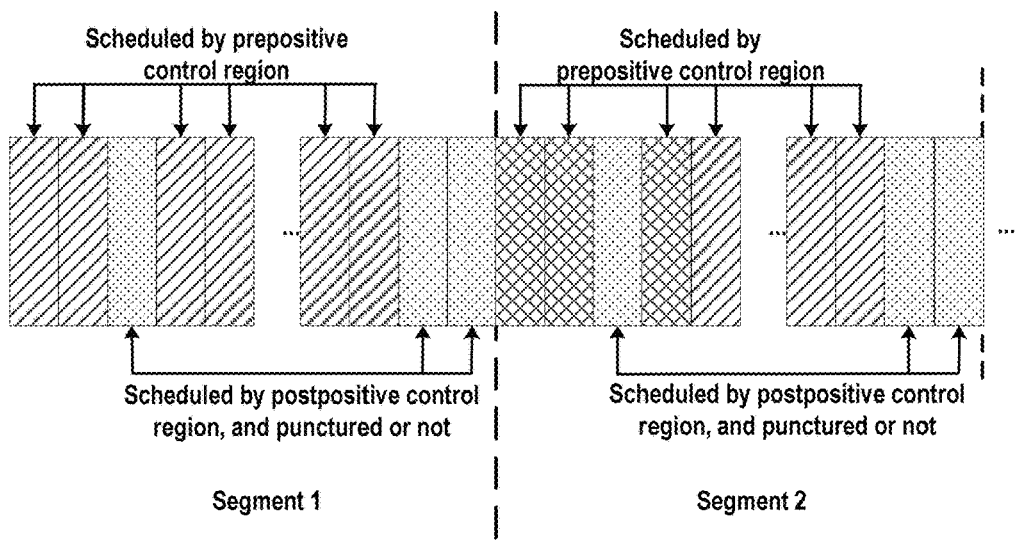
FIG. 8 schematically illustrates a two-DCI solution for eMBB and URLLC multiplexing according to an embodiment of the present disclosure, wherein two segments are used and the second segment is punctured or not punctured without re-transmission.
Figure 9:
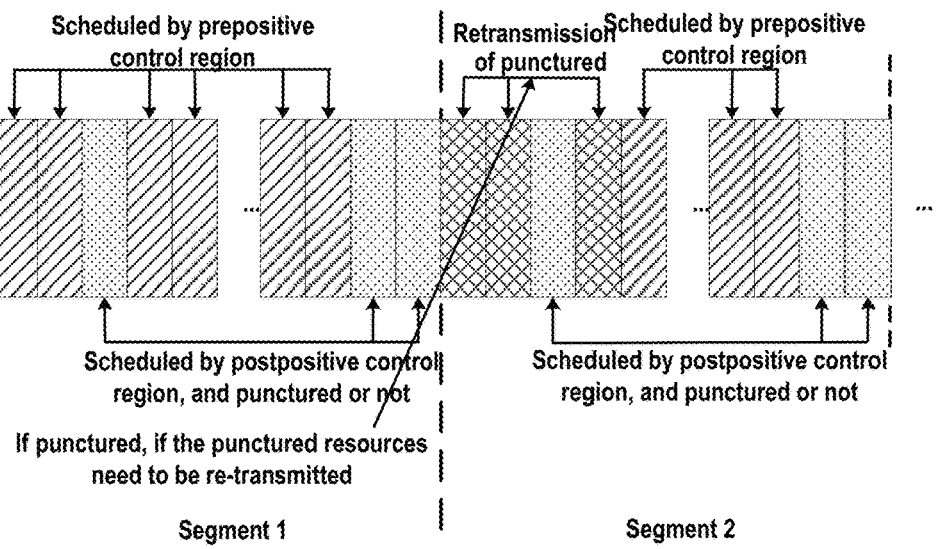
FIG. 9 schematically illustrates a two-DCI solution for eMBB and URLLC multiplexing according to an embodiment of the present disclosure, wherein two segments are used and the second segment is punctured with retransmission.

In a further embodiment of the present disclosure, the resource for eMBB can be split for several parts, wherein first parts are to be scheduled by the preposition control region and seconds parts are to be scheduled by the postpostive control region. The several parts are further divided into two segments in the time domain, i.e., segment 1 and segment 2. For some resources such as first several symbols, the scheduling of URLLC can be known, thus the eMBB UE can be indicated of rate-matching or puncture for the occupied resource in the prepositive control region if it is occupied by the URLLC. While, for some resources, for example when the URLLC occurs abruptly, the scheduling of URLLC cannot be known in the prepositive control region, and thus the eMBB UE can be indicated to puncturing or not puncturing for the occupied resources in the postpositive control region. For some resources in the second segment, they may be reserved for re-transmission or be punctured part of transmission in the first segment. This punctured part can be for example a subset of the first segment, and the remaining of the first segment can be used for new transmission. FIG. 8 illustrates a two-DCI solution wherein there is no re-transmission in the second segment; while FIG. 9 illustrates a two-DCI solution wherein, in the second segment, there is a re-transmission of punctured part of the first segment as indicated by blocks filled with cross lines.

In addition, similarly to solutions as illustrate in FIGS. 6A to 7D, the first parts and the second parts can be multiplexed in time and/or frequency domain. Moreover, these parts can be cascaded to decode, i.e. when UE receives the two parts, then it decodes them immediately or it decodes them after UE receiving the postpositive control region.

In a further aspect of the present disclosure, one transmission block can also be split into several parts. The first part can be scheduled by, for example, prepositive control region, and the second part can be scheduled by, for example, postpositive control region. The UE can decode after receiving the whole transmission block. The end of the transmission can be indicated in a control region. For example, UE may obtain frequency and time domain mapping for data, then obtain the mapping over resources preempted by URLLC, and after that it decodes the block.

In another embodiment of the present disclosure, preemption of URLLC can be indicated implicitly. For example, it is possible to use tracking RS to implicitly indicate preemption of URLLC. For example, if the tracking RS is interrupted on some symbols, this means these symbols are occupied by URLLC, and thus this can be used to indicate preemption of URLLC.

In a further embodiment of the present disclosure, DCI can be cascaded with K-stage DCI. For example, a first stage DCI contains resource allocation field; the second stage DCI contains information of MCS and other information for data transmission (which may also contain detailed information of resource allocation). In such a case, the UE can cascades the two-stage DCI for control information.

Figure 10:
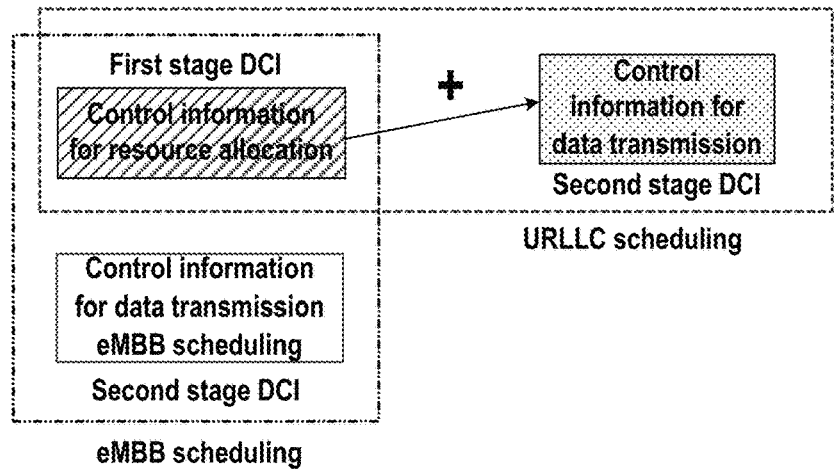
FIG. 10 schematically illustrates an example two-DCI division solution according to an embodiment of the present disclosure.

In addition, the first stage DCI can be shared by different UEs, e.g. URLLC UE and eMBB UE, as illustrated in FIG. 10. The URLLC UE could obtain the shared first stage DCI and the second stage DCI for control and/or data transmission. The eMBB UE could obtain the shared first stage DCI for the resource allocation for puncturing or rate-matching. The shared common DCI can be scrambled with shared RNTI, e.g. a resource allocation RNTI calculated considering the resource index.

In a further embodiment of the present disclosure, the first DCI can include full scheduling information; while the second DCI may include indication of the resource occupied by URLLC or not. In addition, the second DCI can be reduced for some cases. For example, when no MCS needed, the second DCI can be omitted. If the resource is semi-statically reserved for URLLC and known to eMBB UE, the resource allocation is no needed and the second DCI can be reduced as well. In another case, if the resource is known by eMBB UE, and the time-frequency of remaining resource is fixed, then only an indication is needed in the second DCI, which indicates whether the time-frequency resource is occupied. If yes, the resource is for re-transmission or just keeps punctured; if not, the resource will be used for new data transmission.

It shall be noted that although the aspects and embodiments are described separately, they can also be combined together to achieve more benefits.

Figure 11:
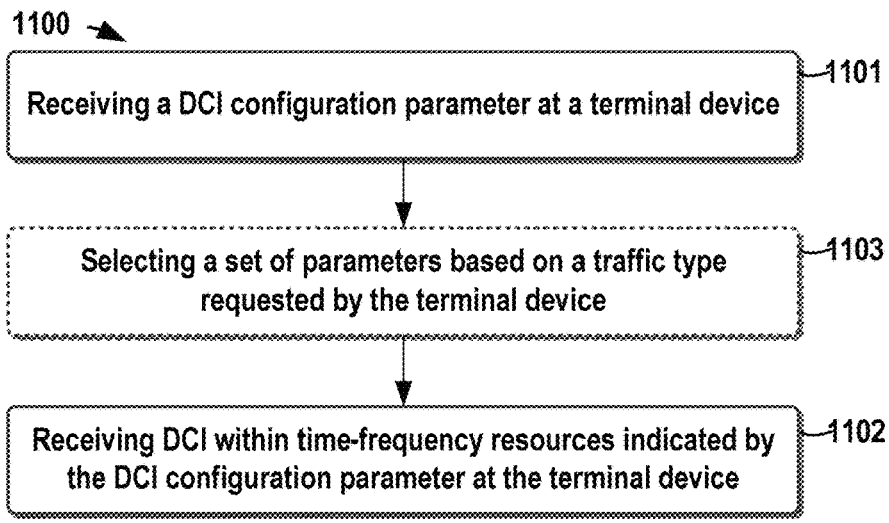
FIG. 11 schematically illustrates a flow chart of a method for DCI receiving according to an embodiment of the present disclosure.

FIG. 11 further schematically illustrates a flow chart of method for DCI receiving according to an example embodiment of the present disclosure. The method 1100 can be implemented at a terminal device, for example UE, or other like terminal devices.

As illustrated in FIG. 11, the method starts from step 11, in which the terminal device like UE receiving a DCI configuration parameter. The DCI configuration parameter indicates the time-frequency resources for the following DCI.

In an embodiment of the present disclosure, the DCI configuration parameter may comprise at least one of: numerology to be used; a valid duration for the DCI configuration parameters; a duration for a single DCI; DCI occurrence occasions.

In another embodiment of the present disclosure, the DCI configuration parameter may comprise at least one of: a frequency domain resource unit; and a frequency hopping pattern.

In a further embodiment of the present disclosure, the receiving DCI configuration parameter may comprise receiving the DCI configuration parameter in a higher layer signaling.

In a further embodiment of the present disclosure, the receiving DCI configuration parameter may comprise receiving the DCI configuration parameter in another DCI.

In addition, considering the payload size of the first DCI, it is also possible to use a combination of DCI and high layer signaling. That is to say, a part of DCI configuration parameter can be received by a first DCI and another part of the DCI configuration parameter can be transmitted by a high layer signaling.

The first DCI can be cell specific, beam specific, TRP specific, common for a UE group or UE specific. In an embodiment of the present disclosure, the DCI can be scrambled with a specific RNTI. The periodicity of the first DCI can be larger than the second DCI. The occurrence occasions of the first DCI can predetermined or configured by a higher layer signaling such a RRC signaling. The first DCI can be located in common search space. Or alternative, the first DCI can also be located in UE specific search space.

Next, in step 1102, DCI is received within time-frequency resources indicated by the DCI configuration parameter at the terminal device. That is to say, at the terminal device, the terminal device may perform DCI monitoring based on the DCI configuration parameter, which means a flexible DCI monitoring solution and thus can support the DCI monitoring occasion change due to numerology and scheduling unit size.

In a still further embodiment of the present disclosure, the DCI configuration parameter comprises at least two sets of parameters. In such a case, further in step 1103, the UE may select a set of parameters based on its requested traffic types. In other words, DCI monitoring can be adapted at UE side after resource requirement by means of random access procedure/SR.

After random access procedure, the terminal device starts DL/UL transmission/reception with the eNB. Thus, the DCI monitoring behavior can be based on the reason for random access. If URLLC scheduling request is the reason for random access, the DCI monitoring should be more frequent. If eMBB scheduling request is the reason for random access, the DCI monitoring can be less frequent. By providing two or more different sets of DCI configuration parameters predefined or configured by RRC signaling, the terminal device could choose the suitable parameter set based on its request traffic type. In such a way, it is possible for UE to perform DCI monitoring based on its required traffic type.

Besides, in the present disclosure, there are also provided apparatuses for DCI transmission and receiving at the serving node and terminal device in a wireless communication system respectively, which will be described next with reference to FIGS. 12 and 13.

Figure 12:
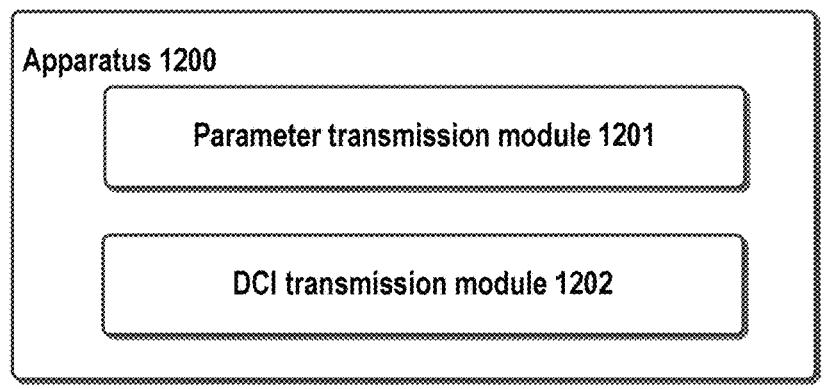
FIG. 12 schematically illustrates a block diagram of an apparatus for DCI transmission according to an embodiment of the present disclosure.

FIG. 12 schematically illustrates a block diagram of an apparatus 1200 for DCI transmission in a wireless communication system according to an embodiment of the present disclosure. The apparatus 1200 can be implemented at a serving node, for example a BS, like a node B (NodeB or NB).

As illustrated in FIG. 12, the apparatus 1200 may comprise a parameter transmission module 1201 and a DCI transmission module 1202. The parameter transmission module 1201 can be configured to transmit a DCI configuration parameter to a terminal device. The DCI transmission module 1202 can be configured to transmit DCI to the terminal device, wherein the DCI configuration parameter indicates time-frequency resources for the DCI.

In an embodiment of the present disclosure, the sequence position information may comprise any of: a numerology to be used; a valid duration for the DCI configuration parameters; a duration for a single DCI; DCI occurrence occasions; a frequency domain resource unit; and a frequency hopping pattern.

In another embodiment of the present disclosure, the parameter transmission module 1201 may be configured to transmit the DCI configuration parameter to the terminal device by a higher layer signaling.

In a further embodiment of the present disclosure, the parameter transmission module 1201 is configured to transmit the DCI configuration parameter to the terminal device dynamically by another DCI.

In a still further embodiment of the present disclosure, the another DCI may have a larger periodicity than the DCI.

In a yet further embodiment of the present disclosure, the DCI configuration parameter may comprise at least two sets of parameters, from which the terminal device can select a set of parameters based on its requested traffic type.

Figure 13:
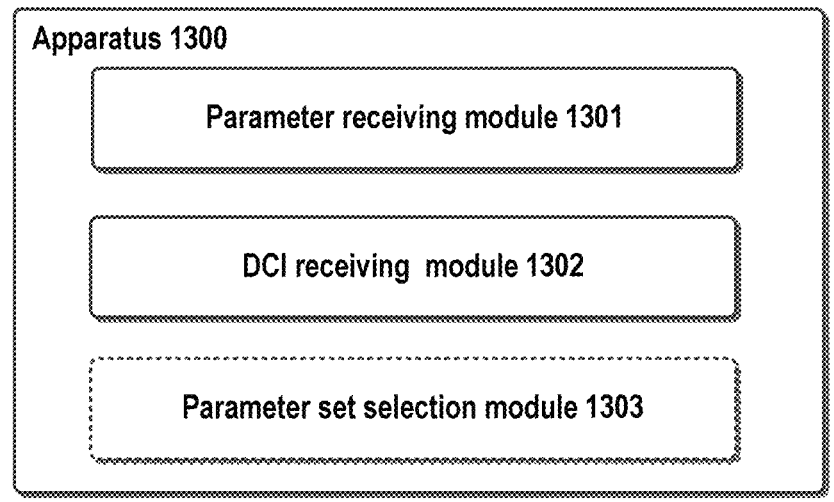
FIG. 13 schematically illustrates a block diagram of an apparatus for DCI receiving according to an embodiment of the present disclosure.

FIG. 13 further schematically illustrates a block diagram of an apparatus 1300 for DCI receiving in a wireless communication system according to an embodiment of the present disclosure. The apparatus 1300 can be implemented at a terminal device, for example UE, or other like terminal devices.

As illustrated in FIG. 13, the apparatus 1300 may include a parameter receiving module 1301 and a DCI receiving module 1302. The parameter receiving module 1301 may be configured to receive DCI configuration parameter at a terminal device. The DCI receiving module 1302 can be configured to receive DCI within time-frequency resources indicated by the DCI configuration parameter at a terminal device.

In an embodiment of the present disclosure, the sequence position information may comprise any of: a numerology to be used; a valid duration for the DCI configuration parameters; a duration for a single DCI; DCI occurrence occasions; a frequency domain resource unit; and a frequency hopping pattern.

In another embodiment of the present disclosure, the parameter receiving module 1301 may be further configured to receive the DCI configuration parameter in a higher layer signaling.

In another embodiment of the present disclosure, the parameter receiving module 1301 may be further configured to receive the DCI configuration parameter in another DCI.

In a still further embodiment of the present disclosure, the another DCI may have a larger periodicity than the DCI.

In a yet further embodiment of the present disclosure, the DCI configuration parameter may comprise at least two sets of parameters. In such a case, the apparatus 1300 may further comprise a parameter set selection module 1303. The apparatus 1300 may be configured to select a set of parameters based on a traffic type requested by the terminal device and wherein the time-frequency resources are those indicated by the selected set of parameters Hereinbefore, the apparatuses 1200 and 1300 are described with reference to FIGS. 12 and 13. It is noted that the apparatuses 1200 and 1300 may be configured to implement functionalities as described with reference to FIGS. 1 to 11. Therefore, for details about the operations of modules in these apparatuses, one may refer to those descriptions made with respect to the respective steps of the methods with reference to FIGS. 1 to 11.

It is further noted that the components of the apparatuses 1200 and 1300 may be embodied in hardware, software, firmware, and/or any combination thereof. For example, the components of apparatuses 1200 and 1300 may be respectively implemented by a circuit, a processor or any other appropriate selection device.

Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In addition, in some embodiment of the present disclosure, apparatuses 1200 and 1300 may comprise at least one processor. The at least one processor suitable for use with embodiments of the present disclosure may include, by way of example, both general and special purpose processors already known or developed in the future. Apparatuses 1200 and 1300 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 1200 and 1300 to at least perform operations according to the method as discussed with reference to FIGS. 1 to 11 respectively.

Figure 14:
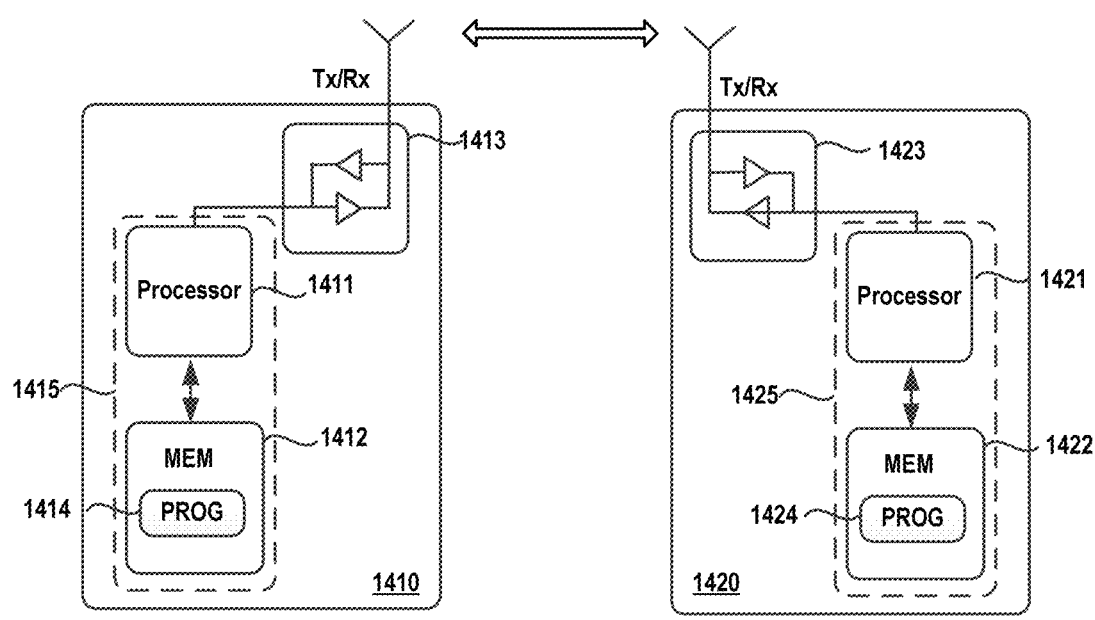
FIG. 14 further illustrates a simplified block diagram of an apparatus 1410 that may be embodied as or comprised in a serving node like a base station in a wireless network and an apparatus 1420 that may be embodied as or comprised in a terminal device like UE as described herein.

FIG. 14 further illustrates a simplified block diagram of an apparatus 1410 that may be embodied as or comprised in a serving node like a base station in a wireless network and an apparatus 1420 that may be embodied as or comprised in a terminal device like UE as described herein.

The apparatus 1410 comprises at least one processor 1411, such as a data processor (DP) and at least one memory (MEM) 1412 coupled to the processor 1411. The apparatus 1410 may further comprise a transmitter TX and receiver RX 1413 coupled to the processor 1411, which may be operable to communicatively connect to the apparatus 1420. The MEM 1412 stores a program (PROG) 1414. The PROG 1414 may include instructions that, when executed on the associated processor 1411, enable the apparatus 1410 to operate in accordance with embodiments of the present disclosure, for example the method 100. A combination of the at least one processor 1411 and the at least one MEM 1412 may form processing means 1415 adapted to implement various embodiments of the present disclosure.

The apparatus 1420 comprises at least one processor 1421, such as a DP, and at least one MEM 1422 coupled to the processor 1421. The apparatus 1420 may further comprise a suitable TX/RX 1423 coupled to the processor 1421, which may be operable for wireless communication with the apparatus 1410. The MEM 1422 stores a PROG 1424. The PROG 1424 may include instructions that, when executed on the associated processor 1421, enable the apparatus 1420 to operate in accordance with the embodiments of the present disclosure, for example to perform the method 1100. A combination of the at least one processor 1421 and the at least one MEM 1422 may form processing means 1425 adapted to implement various embodiments of the present disclosure.

Various embodiments of the present disclosure may be implemented by computer program executable by one or more of the processors 1411, 1421, software, firmware, hardware or in a combination thereof.

The MEMs 1412 and 1422 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1411 and 1421 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with one embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a network device, the method comprising:
   transmitting a downlink configuration parameter to a terminal device,
      wherein the downlink configuration parameter comprises a first downlink control information (DCI) configuration parameter associated with a first traffic type and a second DCI configuration parameter associated with a second traffic type; and
   transmitting at least one of a first DCI and a second DCI to the terminal device,
      wherein the first DCI configuration parameter indicates first time-frequency resources for the first DCI and the second DCI configuration parameter indicates second time-frequency resources for the second DCI.

2. The method of claim 1, wherein the first DCI configuration parameter or the second DCI configuration parameter comprises at least one of:
   a numerology to be used;
   a valid duration for the first DCI configuration parameter or the second DCI configuration parameter;
   a duration for a single DCI; and
   DCI occurrence occasions.

3. The method of claim 1, wherein the first DCI configuration parameter or the second DCI configuration parameter comprises at least one of:
   a frequency domain resource unit; and
   a frequency hopping pattern.

4. The method of claim 1, further comprising transmitting the downlink configuration parameter to the terminal device by a higher layer signaling.

5. A method performed by a terminal device, the method comprising:
   receiving a downlink configuration parameter from a network device,
      wherein the downlink configuration parameter comprises a first downlink control information (DCI) configuration parameter associated with a first traffic type and a second DCI configuration parameter associated with a second traffic type; and
   receiving at least one of a first DCI and a second DCI within time-frequency resources indicated by at least one of the first DCI configuration parameter and the second DCI configuration parameter.

6. The method of claim 5, wherein the first or second DCI configuration parameter comprises at least one of:
   a numerology to be used;
   a valid duration for the first or second DCI configuration parameters;
   a duration for a single DCI;
   DCI occurrence occasions;
   a frequency domain resource unit; and
   a frequency hopping pattern.

7. The method of claim 5 further comprising receiving the downlink configuration parameter via a higher layer signaling.

8. A terminal device comprising a processor configured to
   receive a downlink configuration parameter from a network device, wherein the downlink configuration parameter comprises a first downlink control information (DCI) configuration parameter associated with a first traffic type and a second DCI configuration parameter associated with a second traffic type; and
   receive at least one of the first DCI and second DCI within time-frequency resources indicated by the at least one of the first DCI configuration parameter and the second DCI configuration parameter.

9. The terminal device of claim 8, wherein the first DCI configuration parameter or the second DCI configuration parameter comprises at least one of:
   a numerology to be used;
   a valid duration for the first DCI configuration parameter or the second DCI configuration parameter;
   a duration for a single DCI;
   DCI occurrence occasions;
   a frequency domain resource unit; and
   a frequency hopping pattern.

* * * * *